(No Model.) 3 Sheets—Sheet 1.

J. F. ADDISON.
MACHINE FOR MIXING AND DISTRIBUTING LARD, FATS, OILS, OR OTHER LIQUIDS.

No. 555,551. Patented Mar. 3, 1896.

(No Model.) 3 Sheets—Sheet 2.

J. F. ADDISON.
MACHINE FOR MIXING AND DISTRIBUTING LARD, FATS, OILS, OR OTHER LIQUIDS.

No. 555,551. Patented Mar. 3, 1896.

(No Model.) 3 Sheets—Sheet 3.

J. F. ADDISON.
MACHINE FOR MIXING AND DISTRIBUTING LARD, FATS, OILS, OR OTHER LIQUIDS.

No. 555,551. Patented Mar. 3, 1896.

WITNESSES
J. H. Thomas
W. G. Fitzpatrick.

INVENTOR
John F. Addison
By Chas. H. Fisk
Attorney.

UNITED STATES PATENT OFFICE.

JOHN F. ADDISON, OF DETROIT, MICHIGAN.

MACHINE FOR MIXING AND DISTRIBUTING LARD, FATS, OILS, OR OTHER LIQUIDS.

SPECIFICATION forming part of Letters Patent No. 555,551, dated March 3, 1896.

Application filed June 17, 1895. Serial No. 553,103. (No model.)

*To all whom it may concern:*

Be it known that I, JOHN F. ADDISON, a citizen of the United States, residing at Detroit, county of Wayne, State of Michigan, have invented a certain new and useful Improvement in Machines for Mixing and Distributing Lard, Fats, Oils, or other Liquids; and I declare the following to be a full, clear, and exact description of the invention, such as will enable others skilled in the art to which it pertains to make and use the same, reference being had to the accompanying drawings, which form a part of this specification.

My invention relates to machines for stirring and delivering lard. It is shown in the accompanying drawings, in which—

Figure 1:
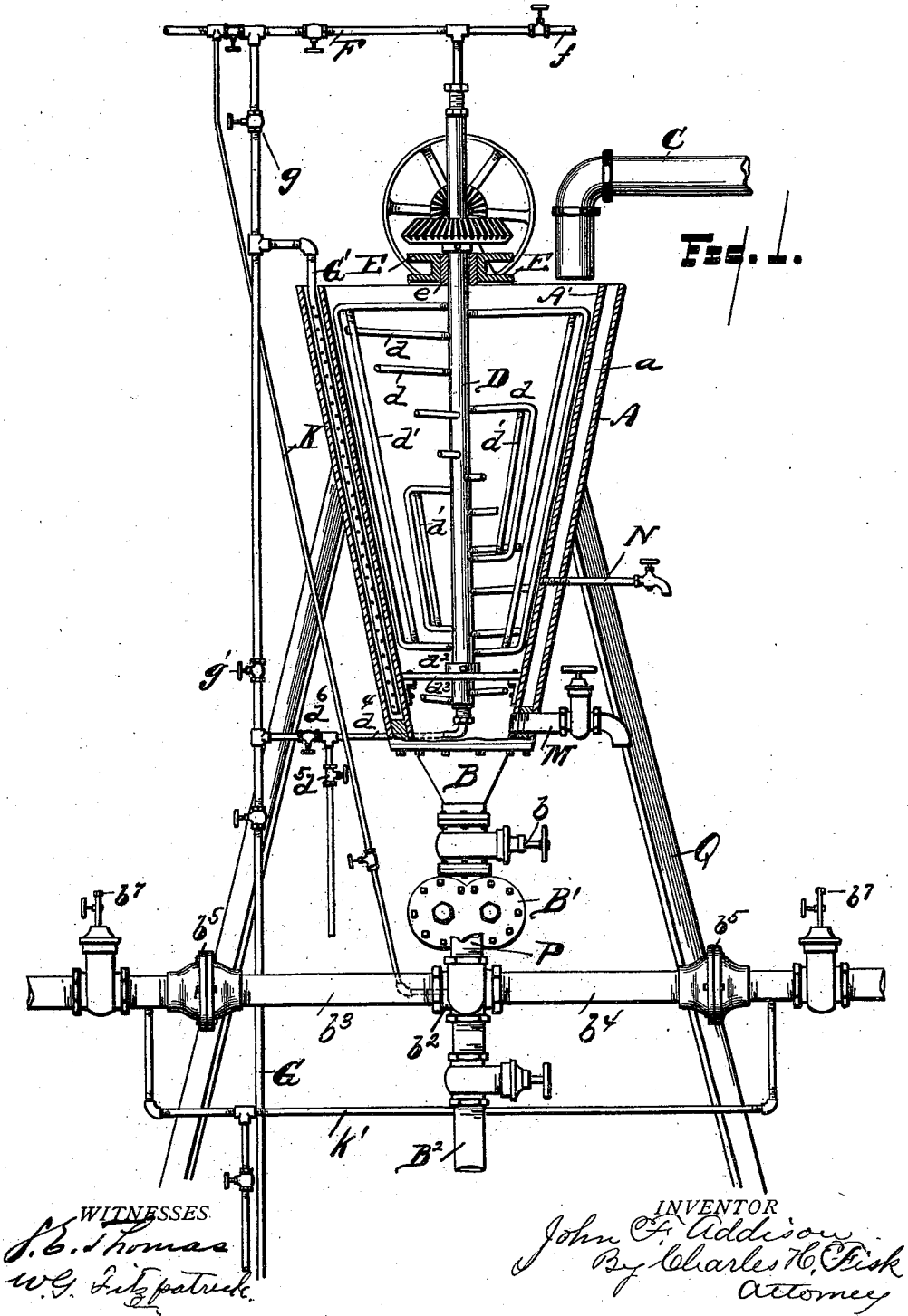
Figure 2:
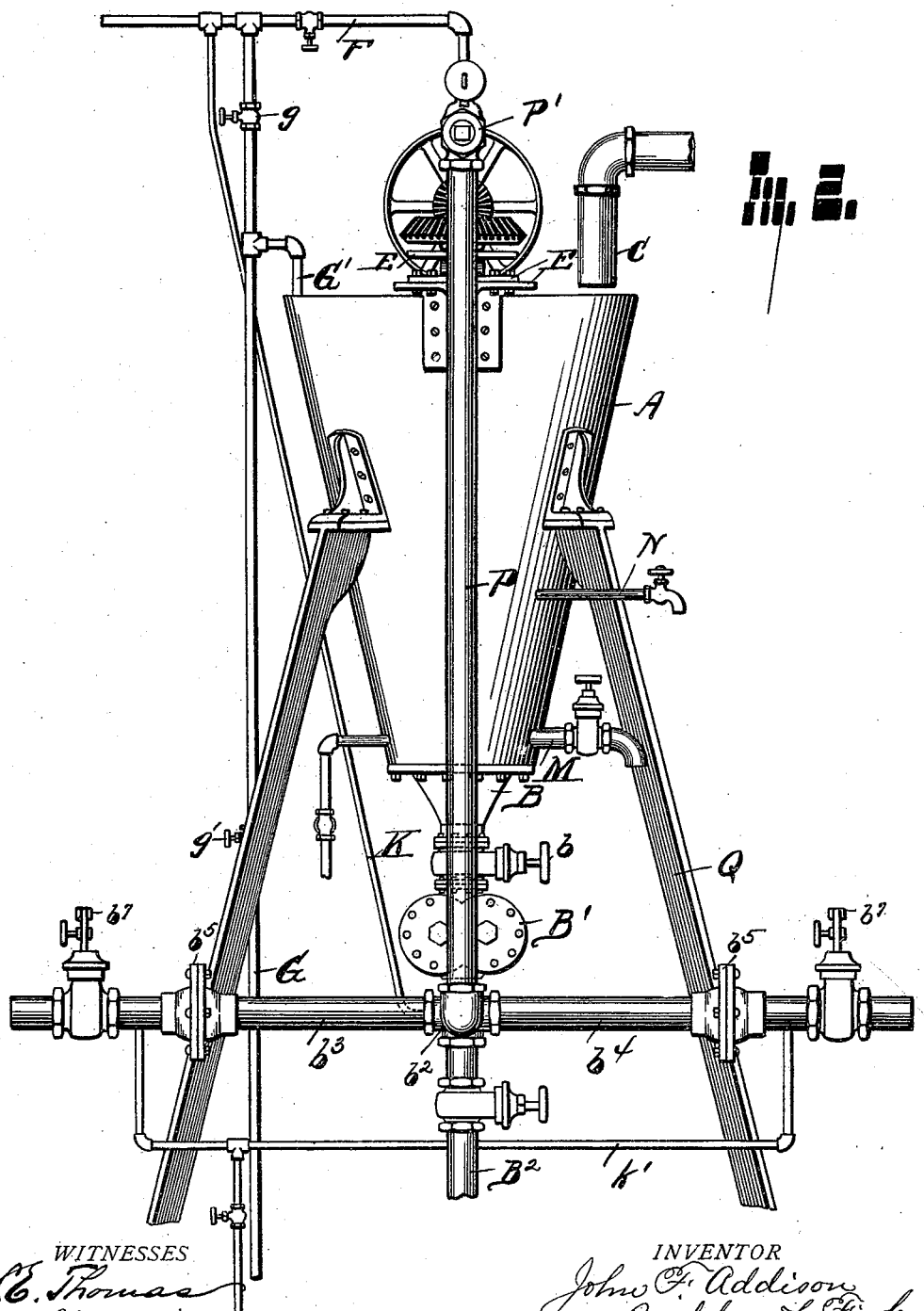
Figure 3:
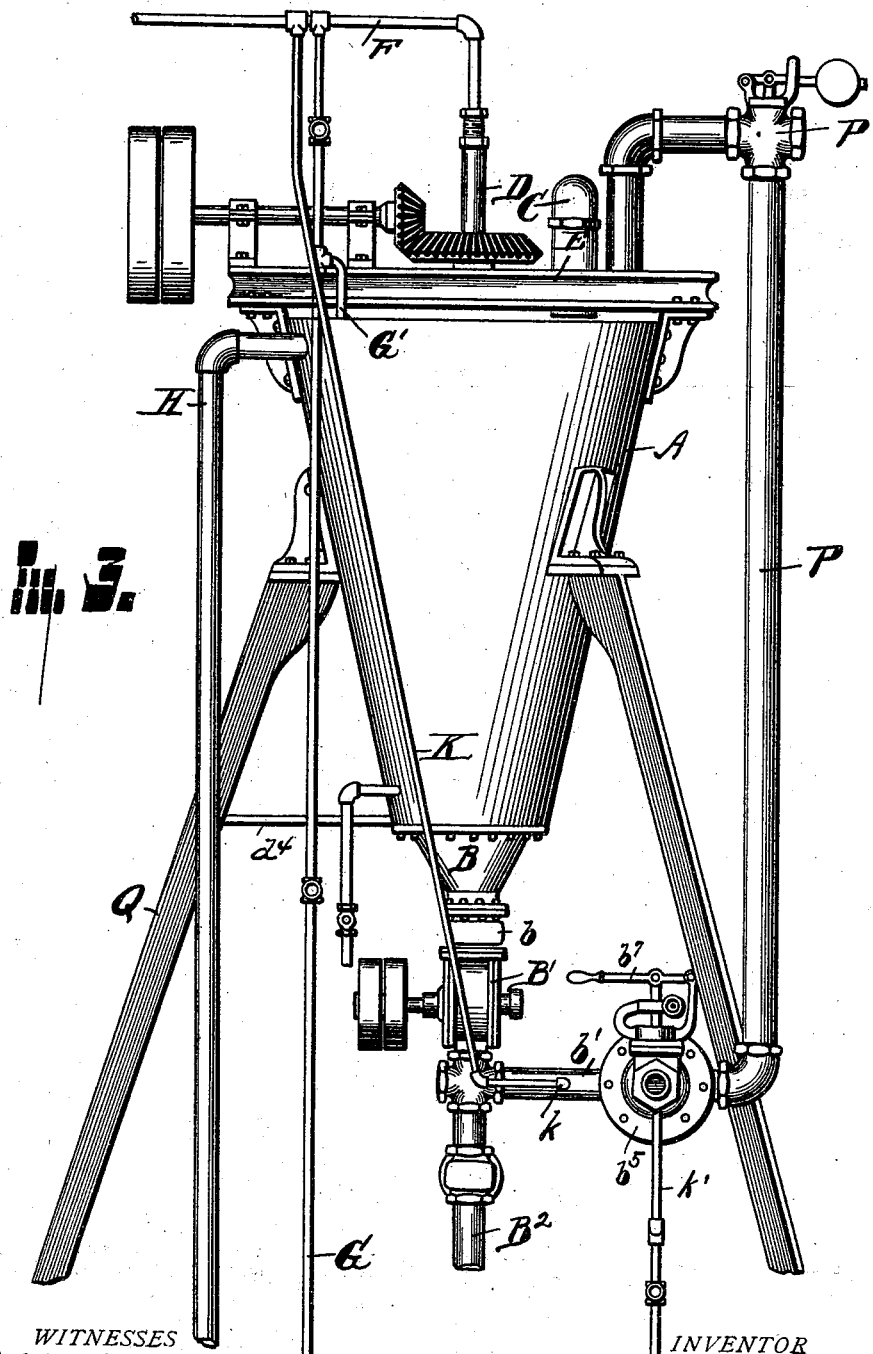

Figure 1 is a view partly in elevation and partly in section. Fig. 2 is a front elevation. Fig. 3 is a side elevation.

In the drawings, A is a jacket within which is the funnel-shaped vat A'.

$a$ is a water-space.

B is the discharge-pipe from the vat, in which is inserted the shut-off valve $b$. Below the valve is the rotary pump B'. This pump is inserted in the line of the discharge-pipe, and its function is to draw the contents from the vat and force them onward through the discharge-pipe. Just below the pump the discharge-pipe proper is turned at right angles, employing the horizontal section $b'$. This section $b'$ terminates in the T $b^2$, in which is set the right and left discharge-pipes $b^3$ and $b^4$.

The object of discharging the contents in opposite directions through two separate pipes is to provide means whereby two men can be employed at the machine in disposing of the product. Each of the last-mentioned pipes is provided with the strainer $b^5$ and with valves, which I prefer to fit with the levers $b^6$ $b^7$, by which they may be operated quickly when the operator desires to draw the product from the machine. I also provide the discharge-pipe below the pump with an outlet $B^2$, through which the contents of the vat can be passed directly when desired, but more particularly when cleaning or washing the vat.

In operating the machine the lard is brought directly from the cooler and delivered to the vat, preferably through a pipe C. This lard passes through the vat and is drawn out by the pump. In its passage through the vat it is essential that it be stirred and worked into a perfectly homogeneous mass. In this working it is also essential that the lard be again slightly warmed to facilitate the working and to prevent its sticking and clogging the several parts of the machine. To accomplish this result, I employ the stirrer, which consists of the hollow vertical shaft D and the hollow radiating arms $d$ $d$. These arms may be simply radiating tubes, or they may have added thereto vertical pipes such as shown at $d'$ $d'$, the purpose being to fill the vat with a mass of moving tubes into which steam or warm water can be admitted to warm the contents of the vat as it is being stirred. The vertical shaft is provided with a collar $d^2$, which supports the shaft on a cross-bar $d^3$. To the bottom of the hollow shaft is coupled a discharge-pipe $d^4$, through which the water of condensation is discharged.

E E are channel-irons, laid across the top of the vat, between which the box $e$ is supported. This box forms the upper bearing for the hollow shaft. The shaft is driven above this bearing by any suitable means, a bevel-gear and pulley being shown in the drawings.

F is the steam-pipe, by which live steam is conducted to the hollow shaft and into the tubes constituting the stirrer.

G is a water-pipe connected at the upper end with the steam-pipe. From this water-pipe is led the pipe G'. This pipe extends nearly to the bottom of the water-space $a$ and is preferably perforated throughout that portion of it that extends below the water-level. This pipe is made either a steam or water pipe, as desired, by the use of the valves $g$ and $g'$.

When it is desired to fill the water-space with water the valve $g$ is closed and the valve $g'$ is opened, which permits the water to flow through the pipes into the water-space. As soon as the water-space is nearly filled the valve $g'$ is closed and the water shut off and the valve $g$ opened and the steam admitted to the pipe G', from which it passes into the water through the perforations in the pipe. By this means steam enough is admitted to keep the water warm.

H is an overflow-pipe connected with the upper portion of the water-chamber.

K is a steam-pipe leading to and entering the discharge-pipe at k. This pipe is led from the point it enters the discharge-pipe through this pipe to the T, and there divided and led in opposite directions through the discharge-pipes and out through the waste-pipe k'. The object of this steam-pipe is to warm up the discharge-pipes whenever necessary to cause their contents to move out freely. Such would be the case after the machine had been stopped a sufficient time to allow the lard remaining in the pipes to cool.

M is a discharge-pipe through which to draw the contents of the vat.

N is a smaller discharge-pipe located farther up the side of the vat, from which to draw the lard in cases where the device is used as a heater and sediment accumulates in the bottom.

In the operation of the machine the lard is placed in the vat just as it comes from the cooling-machine, and the operation of my machine is the last step in the process of manufacturing.

If desired, the machine herein described may be combined with any suitable cooling device, and such device may be located directly over the vat in such position as to deliver the lard directly to the vat. The vat being filled with lard, the machine thoroughly mixes and stirs it, and will continue to stir the lard until the pump is started and it is drawn off. As the action of the pump is regular and constant the machine will deliver at a uniform speed, while the amount drawn off by the attendants will vary according to the cans they may be filling, and at times the discharge will be closed entirely. To furnish relief at such times I provide the relief-pipe P, through which the surplus lard from the pump will be returned to the vat. This relief-pipe is provided with the weighted valve P'. When the pressure of the lard is increased by closing the discharge this valve opens and allows the lard to return to the vat.

The device may be supported by any suitble framework, such as the tripod Q.

By the use of my device I am able to do the work of three large stirring-vats in use before my invention. A great advantage of my device is the facility with which it may be cleaned. Owing to the funnel shape and vertical direction of the vat all of the lard contained in the vat will flow out as soon as the parts are heated sufficiently. As the same machine must be used for mixing and delivering different qualities of lard, it is necessary to clean thoroughly after being used, and to do so it is only necessary to allow the lard to flow out, leaving only such particles as adhere to the several parts of the machine. A sufficient quantity of live steam is then admitted, until the parts of the machine are heated and all of the lard adhering thereto melted and removed, after which the machine is ready for a different quality.

In addition to the particular use for which my device is designed it may be used for several other distinct operations in refining and compounding lard. It is desirable to secure a machine for use in small works that will try the lard and that can then be used to cool and compound it.

Where the device is used to try out the lard in the first instance, the shut-off valve b is closed, the vat filled with leaf-lard, and hot steam turned into the hollow shaft and mixing-pipes and hot water into the water-space around the vat. When the lard is thoroughly cooked it is drawn off through the discharge-pipes M and N. The vat can then be washed to clear it of any scraps that may remain, and the pure lard returned to the vat with such other material as it is desired to compound with it. The steam is shut off and the cold water turned on to the water-pipe. As it is preferable to pass the water, when using the device for cooling purposes, upward through the hollow shaft and stirring-pipes, I provide a direct connection between the water-pipe and the discharge-pipe $d^4$. By closing the valve $d^5$ and opening the valve $d^6$ the cold water flows up into the hollow shaft and through the stirring-pipes and is discharged through the pipe f. If desired, brine may be used in place of this cool water, or other cooling material, such as compressed air. By introducing into these pipes suitable freezing material any temperature desired may be secured.

In compounding lard it is essential that the different materials to be compounded are cooled, otherwise they will separate from one another. By stirring and cooling them at the same time in the vat herein shown they are thoroughly mixed. If any particle of either of the materials to be compounded should remain in lumps, such lumps will be ground up by the pump and further separated and mixed by the strainers. Thus the device herein shown makes a perfect compounding-machine.

What I claim is—

1. A vat provided with means for heating or cooling its contents in order to bring them into a semisolid condition in combination with a discharge-pipe, a strainer in the discharge-pipe and a pump to draw the semiliquid lard from the vat and force it through the strainer, substantially as described.

2. A vat provided with means for stirring, heating and cooling its contents in order to bring them into a semisolid condition, a discharge-pipe a pump and strainer in said discharge-pipe and means for heating the discharge-pipe to prevent the lard solidifying while passing through the discharge-pipe and to warm it when starting or cleaning the machine, substantially as described.

3. A vat provided with means for stirring and heating or cooling its contents in order to bring them into a semisolid condition, a discharge-pipe and a steam-pipe inside of the discharge-pipe to prevent the lard from solidifying while passing through the discharge-pipe and to warm it when starting or cleaning the machine, substantially as described.

4. The combination of the vat provided with means for heating or cooling its contents to reduce them to a semisolid state, a discharge-pipe a pump situated in said discharge-pipe, said pipe provided with several branches below the pump each branch provided with a strainer and shut-off, substantially as described.

5. A vat provided with means for stirring and heating or cooling its contents in order to bring them into a semisolid condition, a discharge-pipe, a pump for drawing the semi-liquid lard from the vat, and a pipe leading from the discharge-pipe outside of the pump to the top of the vat said pipe provided with a weighted valve whereby the lard drawn from the vat by the pump is returned to the vat when the outlet of the discharge is closed, substantially as described.

6. The combination of the vat provided with a discharge-pipe, the hollow stirring-shaft, the steam-pipe communicating with the upper end of said shaft, and a branch pipe having suitable cocks whereby said steam-pipe may be made to communicate directly with the vat discharge-pipe, said vat discharge-pipe having branches provided each with a valve and strainer and with a waste-pipe communicating therewith between its valve and strainer, substantially as described.

7. The combination of the vat having a jacket a pipe G communicating with a steam-supply pipe and with a source of water-supply and provided with a branch G' leading to said jacket surrounding the vat, suitable valves whereby either water or steam may be supplied to said space and the overflow-pipe H, substantially as described.

In testimony whereof I sign this specification in the presence of two witnesses.

JOHN F. ADDISON.

Witnesses:
C. H. FISK,
THOS. L. WILSON.